US012046226B2

(12) United States Patent
Flynn et al.

(10) Patent No.: US 12,046,226 B2
(45) Date of Patent: Jul. 23, 2024

(54) TEXT-TO-SPEECH SYNTHESIS METHOD AND SYSTEM, A METHOD OF TRAINING A TEXT-TO-SPEECH SYNTHESIS SYSTEM, AND A METHOD OF CALCULATING AN EXPRESSIVITY SCORE

(71) Applicant: Spotify AB, Stockholm (SE)

(72) Inventors: John Flynn, London (GB); Zeenat Qureshi, London (GB)

(73) Assignee: Spotify AB, Stockholm (SE)

( * ) Notice: Subject to any disclaimer, the term of this patent is extended or adjusted under 35 U.S.C. 154(b) by 152 days.

(21) Appl. No.: 17/785,810

(22) PCT Filed: Dec. 17, 2020

(86) PCT No.: PCT/GB2020/053266

§ 371 (c)(1),
(2) Date: Jun. 15, 2022

(87) PCT Pub. No.: WO2021/123792

PCT Pub. Date: Jun. 24, 2021

(65) Prior Publication Data

US 2023/0036020 A1 Feb. 2, 2023

(30) Foreign Application Priority Data

Dec. 20, 2019 (GB) ..................................... 1919101

(51) Int. Cl.
*G10L 15/00* (2013.01)
*G10L 13/047* (2013.01)
(Continued)

(52) U.S. Cl.
CPC ............ *G10L 13/047* (2013.01); *G10L 25/30* (2013.01); *G10L 25/63* (2013.01)

(58) Field of Classification Search
None
See application file for complete search history.

(56) References Cited

U.S. PATENT DOCUMENTS

2017/0092258 A1 3/2017 Edrenkin
2018/0336880 A1* 11/2018 Arik ........................ G10L 25/30
(Continued)

FOREIGN PATENT DOCUMENTS

CN 109218885 A * 1/2019 ........... H04R 1/1041
CN 110264991 A * 9/2019 ............ G10L 13/02
(Continued)

OTHER PUBLICATIONS

Prenger, R. et al, "Waveglow: A Flow-based Generative Network for Speech Synthesis", ICASSP 2019-2019 IEEE International Conference on Acoustics, Speech and Signal Processing (ICASSP), IEEE, dated May 17, 2019, pp. 3617-3621.
(Continued)

*Primary Examiner* — Shreyans A Patel
(74) *Attorney, Agent, or Firm* — Morgan, Lewis & Bockius LLP

(57) ABSTRACT

A text-to-speech synthesis method comprising: receiving text; inputting the received text in a prediction network; and generating speech data, wherein the prediction network comprises a neural network, and wherein the neural network is trained by: receiving a first training dataset comprising audio data and corresponding text data; acquiring an expressivity score for each audio sample of the audio data, wherein the expressivity score is a quantitative representation of how well an audio sample conveys emotional information and sounds natural, realistic and human-like; training the neural network using a first sub-dataset, and further training the neural network using a second sub-dataset, wherein the first sub-dataset and the second sub-dataset comprise audio samples and corresponding text from the first training dataset and wherein the average expressivity score of the audio data in the second sub-dataset is higher than the average expressivity score of the audio data in the first sub-dataset.

19 Claims, 11 Drawing Sheets

(51) Int. Cl.

| | |
|---|---|
| ***G10L 25/30*** | (2013.01) |
| ***G10L 25/63*** | (2013.01) |

(56) References Cited

U.S. PATENT DOCUMENTS

| | | | | |
|---|---|---|---|---|
| 2019/0172443 | A1 | 6/2019 | Shechtman et al. | |
| 2019/0180732 | A1 | 6/2019 | Ping et al. | |
| 2023/0036020 | A1 * | 2/2023 | Flynn | G10L 13/02 |

FOREIGN PATENT DOCUMENTS

| | | | | | |
|---|---|---|---|---|---|
| CN | 106971709 | B | * | 10/2021 | G06F 17/16 |
| GB | 2325599 | A | | 11/1998 | |
| KR | 20190118539 | A | * | 9/2019 | |
| WO | 2019222591 | A1 | | 11/2019 | |

OTHER PUBLICATIONS

International Search Report and Written Opinion in related international application PCT/GB2020/053266, dated Apr. 16, 2021, pp. 1-14.

Jia, Y., et al, "Transfer Learning from Speaker Verification to Multispeaker Text-to-Speech Synthesis", arxiv.org, Cornell University Library, dated Jun. 12, 2018, pp. 5-8.

International Preliminary Report on Patentability in related international application PCT/GB2020/053266, dated May 17, 2022, pp. 1-10.

De Cheveigné et al., "YIN, a fundamental frequency estimator for speech and music", The Journal of the Acoustical Society of America, 2002, 111(4):1917-30, 14 pgs.

Flynn et al., GB First Search Report and Examination Report, GB1919101.4, May 21, 2020, 6 pgs.

Kalchbrenner et al., "Efficient neural audio synthesis", Proceedings of the 35$^{th}$ International Conference on Machine Learning, PMLR 80:2410-2419, 2018, 10 pgs.

Prenger et al., "WaveGlow: A Flow-based Generative Network for Speech Synthesis", 2019 IEEE International Conference on Acoustics, Speech, and Signal Processing (ICASSP), Oct. 31, 2018, 5 pgs.

Rikters et al., "Confidence through Attention", arXiv preprint arXiv:1710.03743. Oct. 10, 2017, 13 pgs.

Shen et al., "Natural TTS Synthesis by Conditioning WaveNet on Mel Spectrogram Predictions", 2018 IEEE International Conference on Acoustics, Speech and Signal Processing (ICASSP), Calgary, Canada, Dec. 16, 2017, 5 pgs.

Van den Oord et al., "WaveNet: A Generative Model for Raw Audio," arXiv preprint arXiv:1609.03499, Sep. 19, 2016, 15 pgs.

Spotify AB, Communication Pursuant to Article 94(3), EP20838196.2, Oct. 5, 2023, 3 pgs.

Spotify AB, Intention to Grant, EP20838196.2, Jan. 8, 2024, 9 pgs.

* cited by examiner

TEXT-TO-SPEECH SYNTHESIS METHOD AND SYSTEM, A METHOD OF TRAINING A TEXT-TO-SPEECH SYNTHESIS SYSTEM, AND A METHOD OF CALCULATING AN EXPRESSIVITY SCORE

CROSS REFERENCE TO RELATED APPLICATIONS

This application is the U.S. National Phase of PCT/GB2020/053266, filed Dec. 17, 2020, which claims priority to United Kingdom Application No. 1919101.4, filed Dec. 20, 2019. The contents of all these applications are incorporated herein by reference in their entirety.

FIELD

Embodiments described herein relate to a text-to-speech synthesis method, a text-to-speech synthesis system, and a method of training a text-to speech system.

Embodiments described herein also relate to a method of calculating an expressivity score.

BACKGROUND

Text-to-speech (TTS) synthesis methods and systems are used in many applications, for example in devices for navigation and personal digital assistants. TTS synthesis methods and systems can also be used to provide speech segments that can be used in games, movies or other media comprising speech.

There is a continuing need to improve TTS synthesis systems. In particular, there is a need to improve the quality of speech generated by TTS systems such that the speech generated retains vocal expressiveness. Expressive speech may convey emotional information and sounds natural, realistic and human-like. TTS systems often comprise algorithms that need to be trained using training samples and there is a continuing need to improve the method by which the TTS system is trained such that the TTS system generates expressive speech.

BRIEF DESCRIPTION OF FIGURES

Systems and methods in accordance with non-limiting examples will now be described with reference to the accompanying figures in which:

FIG. 3(*b*) shows a schematic illustration of the training of a Vocoder in accordance with an embodiment;

FIG. 3(*c*) shows a schematic illustration of the training of a Vocoder in accordance with another embodiment;

FIG. 5(*b*) is a schematic illustration of audio dataset and their expressivity scores;

FIG. 7(*b*) shows an illustration of the training data selector increasing the average expressivity scores by pruning the data set according to one embodiment;

FIG. 7(*c*) shows an illustration of the training data selector selecting data from a first training dataset and a second training dataset according to one embodiment;

DETAILED DESCRIPTION

Figure 1:
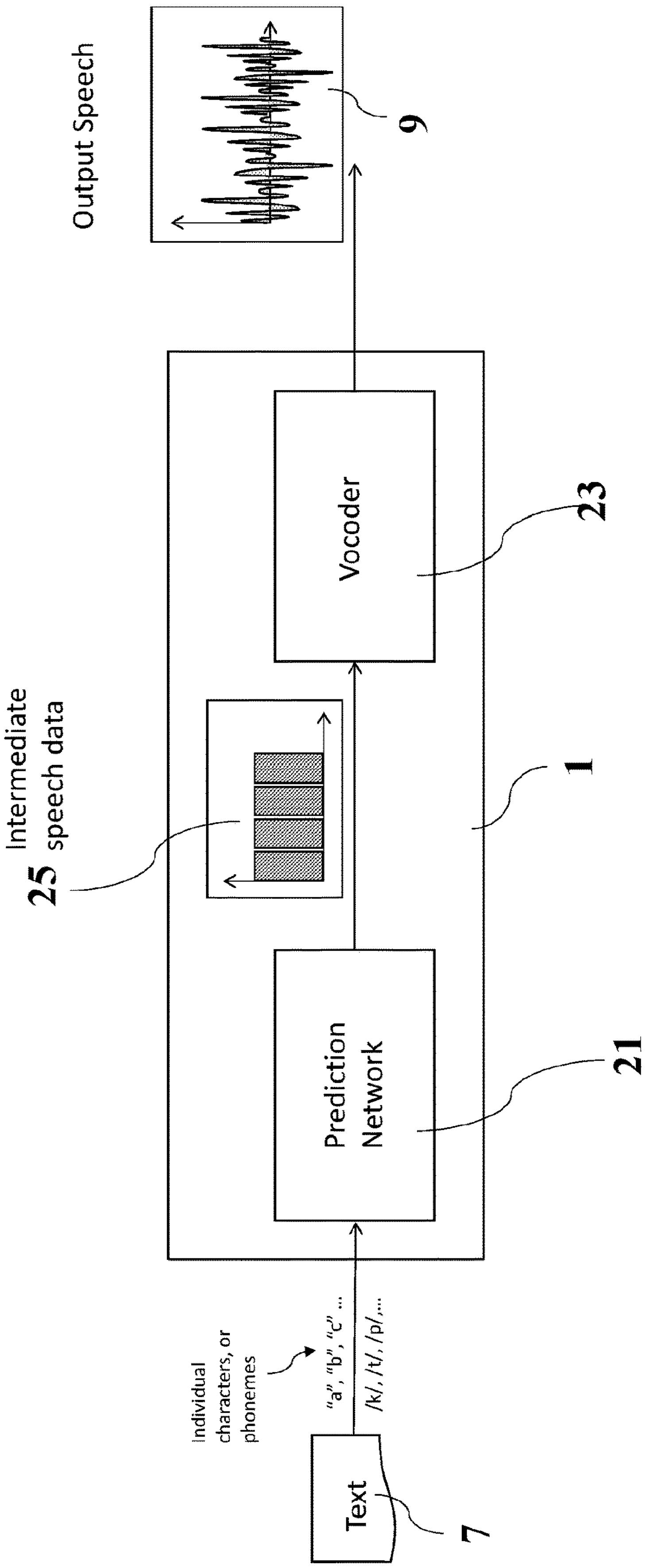
FIG. 1 shows a schematic illustration of a text-to-speech (TTS) synthesis system for generating speech from text in accordance with an embodiment.

According to a first aspect of the invention, there is provided a text-to-speech synthesis method comprising:

receiving text;

inputting the received text in a prediction network; and generating speech data, wherein the prediction network comprises a neural network, and wherein the neural network is trained by:

receiving a first training dataset comprising audio data and corresponding text data;

acquiring an expressivity score to each audio sample of the audio data, wherein the expressivity score is a quantitative representation of how well an audio sample conveys emotional information and sounds natural, realistic and human-like;

training the neural network using a first sub-dataset, and further training the neural network using a second sub-dataset, wherein the first sub-dataset and the second sub-dataset comprise audio data and corresponding text data from the first training dataset and wherein the average expressivity score of the audio data in the second sub-dataset is higher than the average expressivity score of the audio data in the first sub-dataset.

Methods in accordance with embodiment described herein provide an improvement to text-to-speech synthesis by providing a neural network that is trained to generate expressive speech. Expressive speech is speech that conveys emotional information and sounds natural, realistic and human-like. The disclosed method ensures that the trained neural network can accurately generate speech from text, the generated speech is comprehensible, and is more expressive than speech generated using a neural network trained using the first dataset directly.

In an embodiment, the expressivity score is obtained by extracting a first speech parameter for each audio sample; deriving a second speech parameter from the first speech parameter; comparing the value of the second parameter to the first speech parameter.

In an embodiment, the first speech parameter comprises the fundamental frequency.

In an embodiment, the second speech parameter comprises the average of the first speech parameter of all audio samples in the dataset.

In another embodiment, the first speech parameter comprises a mean of the square of the rate of change of the fundamental frequency.

In an embodiment, the second sub-dataset is obtained by pruning audio samples with lower expressivity scores from the first sub-dataset.

In an embodiment, audio samples with a higher expressivity score are selected from the first training dataset and allocated to the second sub-dataset, and audio samples with a lower expressive score are selected from the first training dataset and allocated to the first sub-dataset.

In an embodiment, the neural network is trained using the first sub-dataset for a first number of training steps, and then using the second sub-dataset for a second number of training steps.

In an embodiment, the neural network is trained using the first sub-dataset for a first time duration, and then using the second sub-dataset for a second time duration.

In an embodiment, the neural network is trained using the first sub-dataset until a training metric achieves a first predetermined threshold, and then further trained using the second sub-dataset. In an example, the training metric is a quantitative representation of how well the output of the trained neural network matches a corresponding audio data sample.

According to a second aspect of the invention, there is provided a method of calculating an expressivity score of audio samples in a dataset, the method comprising: extracting a first speech parameter for each audio sample of the dataset; deriving a second speech parameter from the first speech parameter; and comparing the value of the second parameter to the first parameter.

The disclosed method provides an improvement in the evaluation of an expressivity score for an audio sample. The disclosed method is quick and accurate. Empirically, it has been observed that the disclosed method correlates well with subjective assessments of expressivity made by human operators. The disclosed method is quicker, more consistent, more accurate, and more reliable than assessments of expressivity made by human operators.

According to a third aspect of the invention, there is provided a method of training a text-to-speech synthesis system that comprises a prediction network, wherein the prediction network comprises a neural network, the method comprising: receiving a first training dataset comprising audio data and corresponding text data;

acquiring an expressivity score to each audio sample of the audio data, wherein the expressivity score is a quantitative representation of how well an audio sample conveys emotional information and sounds natural, realistic and human-like;

training the neural network using a first sub-dataset, and further training the neural network using a second sub-dataset, wherein the first sub-dataset and the second sub-dataset comprise audio samples and corresponding text from the first training dataset and wherein the average expressivity score of the audio data in the second sub-dataset is higher than the average expressivity score of the audio data in the first sub-dataset.

In an embodiment, the method further comprised training the neural network using a second training dataset. The neural network may be trained to gain further speech abilities.

In an embodiment the average expressivity score of the audio data in the second training dataset is higher than the average expressivity score of the audio data in the first training dataset.

According to a fourth aspect of the invention, there is provided a text-to-speech synthesis system comprising:

a prediction network that is configured to receive text and generate speech data, wherein the prediction network comprises a neural network, and wherein the neural network is trained by:

receiving a first training dataset comprising audio data and corresponding text data;

acquiring an expressivity score to each audio sample of the audio data, wherein the expressivity score is a quantitative representation of how well an audio sample conveys emotional information and sounds natural, realistic and human-like;

training the neural network using a first sub-dataset, and further training the neural network using a second sub-dataset, wherein the first sub-dataset and the second sub-dataset comprise audio samples and corresponding text from the first training dataset and wherein the average expressivity score of the audio data in the second sub-dataset is higher than the average expressivity score of the audio data in the first sub-dataset.

In an embodiment, the system comprises a vocoder that is configured to convert the speech data into an output speech data. In an example, the output speech data comprises an audio waveform.

In an embodiment, the system comprises an expressivity scorer module configured to calculate an expressivity score for audio samples.

In an embodiment, the prediction network comprises a sequence-to-sequence model.

According to a fifth aspect of the invention, there is provided speech data generated by a text-to-speech system according to the third aspect of the invention. The speech data disclosed is expressive and that conveys emotional information and sounds natural, realistic and human-likes.

In an embodiment, the speech data is an audio file of synthesised expressive speech.

According to a sixth aspect of the invention, there is provided a carrier medium comprising computer readable code configured to cause a computer to perform any of the methods above.

The methods are computer-implemented methods. Since some methods in accordance with examples can be implemented by software, some examples encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

Figure 5A:
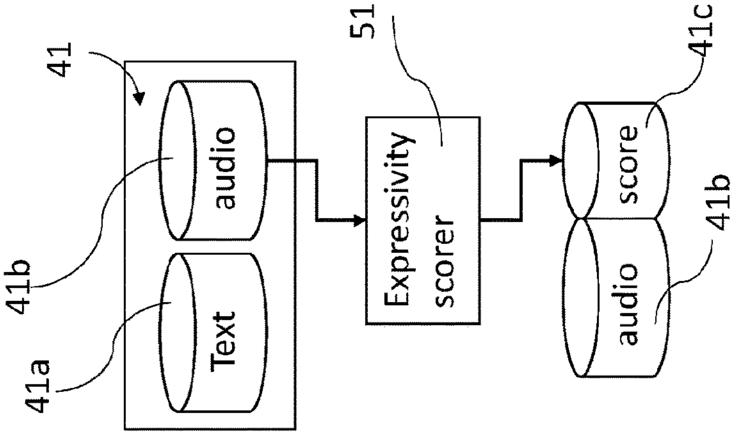
FIG. 5(*a*) shows a schematic illustration of an Expressivity scorer that assigns a score to the audio training data.

FIG. 1 shows a schematic illustration of a system 1 for generating speech 9 from text 7. The system 1 can be trained to generate speech that is expressive. Expressive speech conveys emotional information and sounds natural, realistic and human-like. Quantitatively, the expressiveness of an audio sample is represented by an expressivity score; the expressivity score is described further below in relation to FIGS. 5*a*, 5*b*, and 6.

The system comprises a prediction network 21 configured to convert input text 7 into a speech data 25. The speech data 25 is also referred to as the intermediate speech data 25. The system further comprises a Vocoder that converts the intermediate speech data 25 into an output speech 9. The prediction network 21 comprises a neural network (NN). The Vocoder also comprises a NN.

The prediction network 21 receives a text input 7 and is configured to convert the text input 7 into an intermediate speech data 25. The intermediate speech data 25 comprises information from which an audio waveform may be derived. The intermediate speech data 25 may be highly compressed while retaining sufficient information to convey vocal expressiveness. The generation of the intermediate speech data 25 will be described further below in relation to FIG. 2(*a*).

The text input 7 may be in the form of a text file or any other suitable text form such as ASCII text string. The text may be in the form of single sentences or longer samples of text. A text front-end, which is not shown, converts the text sample into a sequence of individual characters (e.g. "a", "b", "c" . . . ). In another example, the text front-end converts the text sample into a sequence of phonemes (/k/, /p/, . . . ).

The intermediate speech data 25 comprises data encoded in a form from which a speech sound waveform can be obtained. For example, the intermediate speech data may be a frequency domain representation of the synthesised speech. In a further example, the intermediate speech data is a spectrogram. A spectrogram may encode a magnitude of a complex number as a function of frequency and time. In a further example, the intermediate speech data 25 may be a mel spectrogram. A mel spectrogram is related to a speech sound waveform in the following manner: a short-term Fourier transform (STFT) is computed over a finite frame size, where the frame size may be 50 ms, and a suitable window function (e.g. a Hann window) may be used; and the magnitude of the STFT is converted to a mel scale by applying a non-linear transform to the frequency axis of the STFT, where the non-linear transform is, for example, a logarithmic function.

The Vocoder module takes the intermediate speech data 25 as input and is configured to convert the intermediate speech data 25 into a speech output 9. The speech output 9 is an audio file of synthesised expressive speech and/or information that enables generation of expressive speech. The Vocoder module will be described further below.

In another example, which is not shown, the intermediate speech data 25 may be in a form from which an output speech 9 can be directly obtained. In such a system, the Vocoder 23 is optional.

Figure 2:
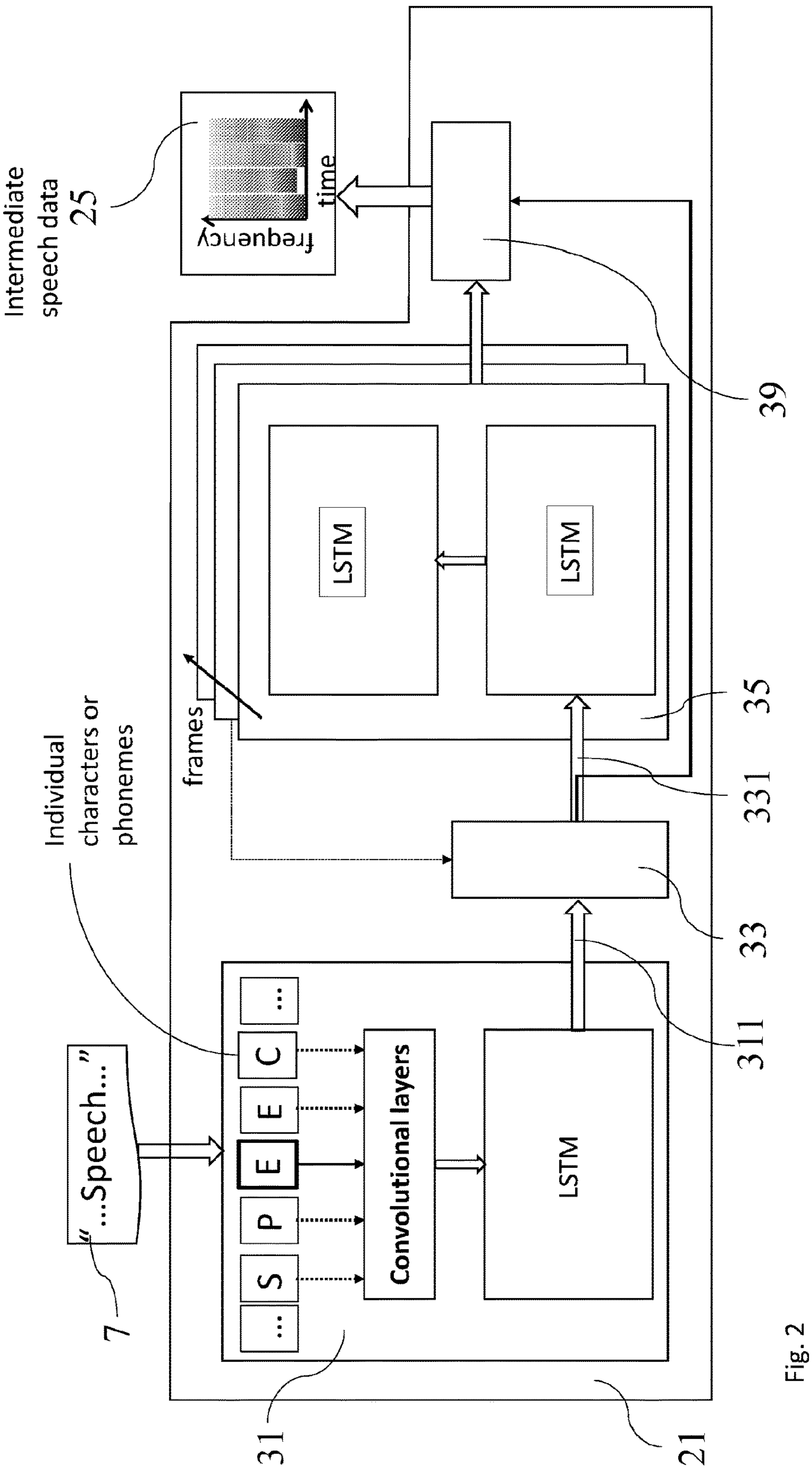
FIG. 2 shows a schematic illustration of a prediction network that converts textual information into intermediate speech data in accordance with an embodiment.

FIG. 2 shows a schematic illustration of the prediction network 21 according to a non-limiting example. It will be understood that other types of prediction networks that comprise neural networks (NN) could also be used.

The prediction network 21 comprises an Encoder 31, an attention network 33, and decoder 35. As shown in FIG. 2, the prediction network maps a sequence of characters to intermediate speech data 25. In an alternative example which is not shown, the prediction network maps a sequence of phonemes to intermediate speech data 25. In an example, the prediction network is a sequence to sequence model. A sequence to sequence model maps a fixed length input from one domain to a fixed length output in a different domain, where the length of the input and output may differ.

The Encoder 31 takes as input the text input 7. The encoder 31 comprises a character embedding module (not shown) which is configured to convert the text input 7, which may be in the form words, sentences, paragraphs, or other forms, into a sequence of characters. Alternatively, the encoder may convert the text input into a sequence of phonemes. Each character from the sequence of characters may be represented by a learned 512-dimensional character embedding. Characters from the sequence of characters are passed through a number of convolutional layers. The number of convolutional layers may be equal to three for example. The convolutional layers model longer term context in the character input sequence. The convolutional layers each contain 512 filters and each filter has a 5×1 shape so that each filer spans 5 characters. After the stack of three convolutional layers, the input characters are passed through batch normalization step (not shown) and ReLU activations (not shown). The encoder 31 is configured to convert the sequence of characters (or alternatively phonemes) into encoded features 311 which is then further processed by the attention network 33 and the decoder 35.

The output of the convolutional layers is passed to a recurrent neural network (RNN). The RNN may be a long-short term memory (LSTM) neural network (NN). Other types of RNN may also be used. According to one example, the RNN may be a single bi-directional LSTM containing 512 units (256 in each direction). The RNN is configured to generate encoded features 311. The encoded features 311 output by the RNN may be a vector with a dimension k.

The Attention Network 33 is configured to summarize the full encoded features 311 output by the RNN and output a fixed-length context vector 331. The fixed-length context vector 331 is used by the decoder 35 for each decoding step. The attention network 33 may take information (such as weights) from previous decoding steps (that is, from previous speech frames decoded by decoder) in order to output a fixed-length context vector 331. The function of the attention network 33 may be understood to be to act as a mask that focusses on the important features of the encoded features 311 output by the encoder 31. This allows the decoder 35, to focus on different parts of the encoded features 311 output by the encoder 31 on every step. The output of the attention network 33, the fixed-length context vector 331, may have dimension m, where m may be less than k. According to a further example, the Attention network 33 is a location-based attention network.

According to one embodiment, the attention network 33 takes as input an encoded feature vector 311 denoted ash={h1, h2, . . . , hk}. A(i) is a vector of attention weights (called alignment). The vector A(i) is generated from a function attend(s(i−1), A(i−1), h), where s(i−1) is a previous decoding state and A(i−1) is a previous alignment. s(i−1) is 0 for the first iteration of first step. The attend( ) function is implemented by scoring each element in h separately and normalising the score. G(i) is computed from $G(i)=\Sigma^k A(i, k)\times h_k$. The output of the attention network 33 is generated as Y(i)=generate(s(i−1), G(i)), where generate( ) may be implemented using a recurrent layer of 256 gated recurrent units (GRU) units for example. The attention network 33 also computes a new state s(i)=recurrency(s(i−1), G(i), Y(i)), where recurrency( ) is implemented using LSTM.

The decoder 35 is an autoregressive RNN which decodes information one frame at a time. The information directed to the decoder 35 is be the fixed length context vector 331 from the attention network 33. In another example, the information directed to the decoder 35 is the fixed length context vector 331 from the attention network 33 concatenated with a prediction of the decoder 35 from the previous step. In each decoding step, that is, for each frame being decoded, the decoder may use the results from previous frames as an input to decode the current frame. In an example, as shown in FIG. 2, the decoder autoregressive RNN comprises two uni-directional LSTM layers with 1024 units. The prediction from the previous time step is first passed through a small pre-net (not shown) containing 2 fully connected layers of 256 hidden ReLU units. The output of the pre-net, and the attention context vector are concatenated and then passed through the two uni-directional LSTM layers. The output of the LSTM layers is directed to a predictor 39 where it is concatenated with the fixed-length context vector 331 from the attention network 33 and projected trough a linear transform to predict a target mel spectrogram. The predicted mel spectrogram is further passed through a 5-layer convolutional post-net which predicts a residual to add to the prediction to improve the overall reconstruction. Each post-net layer is comprised of 512 filters with shape 5×1 with batch normalization, followed by tanh activations on all but the final layer. The output of the predictor 39 is the speech data 25.

The parameters of the encoder 31, decoder 35, predictor 39 and the attention weights of the attention network 33 are the trainable parameters of the prediction network 21.

According to another example, the prediction network 21 comprises an architecture according to Shen et al. "Natural tts synthesis by conditioning wavenet on mel spectrogram predictions." 2018 IEEE International Conference on Acoustics, Speech and Signal Processing (ICASSP). IEEE, 2018.

Returning to FIG. 1, the Vocoder 23 is configured to take the intermediate speech data 25 from the prediction network 21 as input, and generate an output speech 9. In an example, the output of the prediction network 21, the intermediate speech data 25, is a mel spectrogram representing a prediction of the speech waveform.

According to an embodiment, the Vocoder 23 comprises a convolutional neural network (CNN). The input to the Vocoder 23 is a frame of the mel spectrogram provided by the prediction network 21 as described above in relation to FIG. 1. The mel spectrogram 25 may be input directly into the Vocoder 23 where it is inputted into the CNN. The CNN of the Vocoder 23 is configured to provide a prediction of an output speech audio waveform 9. The predicted output speech audio waveform 9 is conditioned on previous samples of the mel spectrogram 25. The output speech audio waveform may have 16-bit resolution. The output speech audio waveform may have a sampling frequency of 24 kHz.

According to an alternative example, the Vocoder 23 comprises a convolutional neural network (CNN). The input to the Vocoder 23 is derived from a frame of the mel spectrogram provided by the prediction network 21 as described above in relation to FIG. 2. The mel spectrogram 25 is converted to an intermediate speech audio waveform by performing an inverse STFT. Each sample of the speech audio waveform is directed into the Vocoder 23 where it is inputted into the CNN. The CNN of the Vocoder 23 is configured to provide a prediction of an output speech audio waveform 9. The predicted output speech audio waveform 9 is conditioned on previous samples of the intermediate speech audio waveform. The output speech audio waveform may have 16-bit resolution. The output speech audio waveform may have a sampling frequency of 24 kHz.

According to another example, the Vocoder 23 comprises a WaveNet NN architecture such as that described in Shen et al. "Natural tts synthesis by conditioning wavenet on mel spectrogram predictions." 2018 IEEE International Conference on Acoustics, Speech and Signal Processing (ICASSP). IEEE, 2018.

According to a further example, the Vocoder 23 comprises a WaveGlow NN architecture such as that described in Prenger et al. "Waveglow: A flow-based generative network for speech synthesis." ICASSP 2019-2019 IEEE International Conference on Acoustics, Speech and Signal Processing (ICASSP). IEEE, 2019.

According to an alternative example, the Vocoder 23 comprises any deep learning based speech model that converts an intermediate speech data 25 into output speech 9.

According to another alternative embodiment, the Vocoder 23 is optional. Instead of a Vocoder, the prediction network 21 of the system 1 further comprises a conversion module (not shown) that converts intermediate speech data 25 into output speech 9. The conversion module may use an algorithm rather than relying on a trained neural network. In an example, the Griffin-Lim algorithm is used. The Griffin-Lim algorithm takes the entire (magnitude) spectrogram from the intermediate speech data 25, adds a randomly initialised phase to form a complex spectogram, and iteratively estimates the missing phase information by: repeatedly converting the complex spectrogram to a time domain signal, converting the time domain signal back to frequency domain using STFT to obtain both magnitude and phase, and updating the complex spectrogram by using the original magnitude values and the most recent calculated phase values. The last updated complex spectrogram is converted to a time domain signal using inverse STFT to provide output speech 9.

Figure 3:
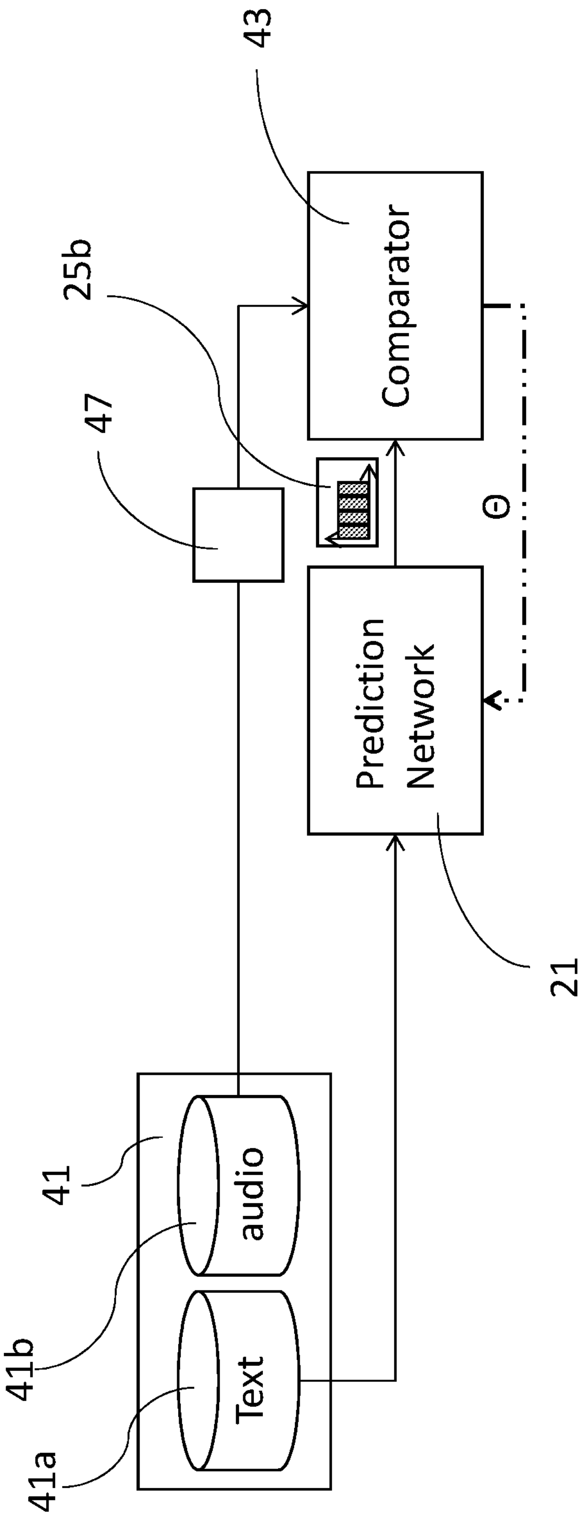
FIG. 3(*a*)) shows a schematic illustration of the training of the prediction network of FIG. 2 in accordance with an example useful for understanding the invention.
Figure 3:
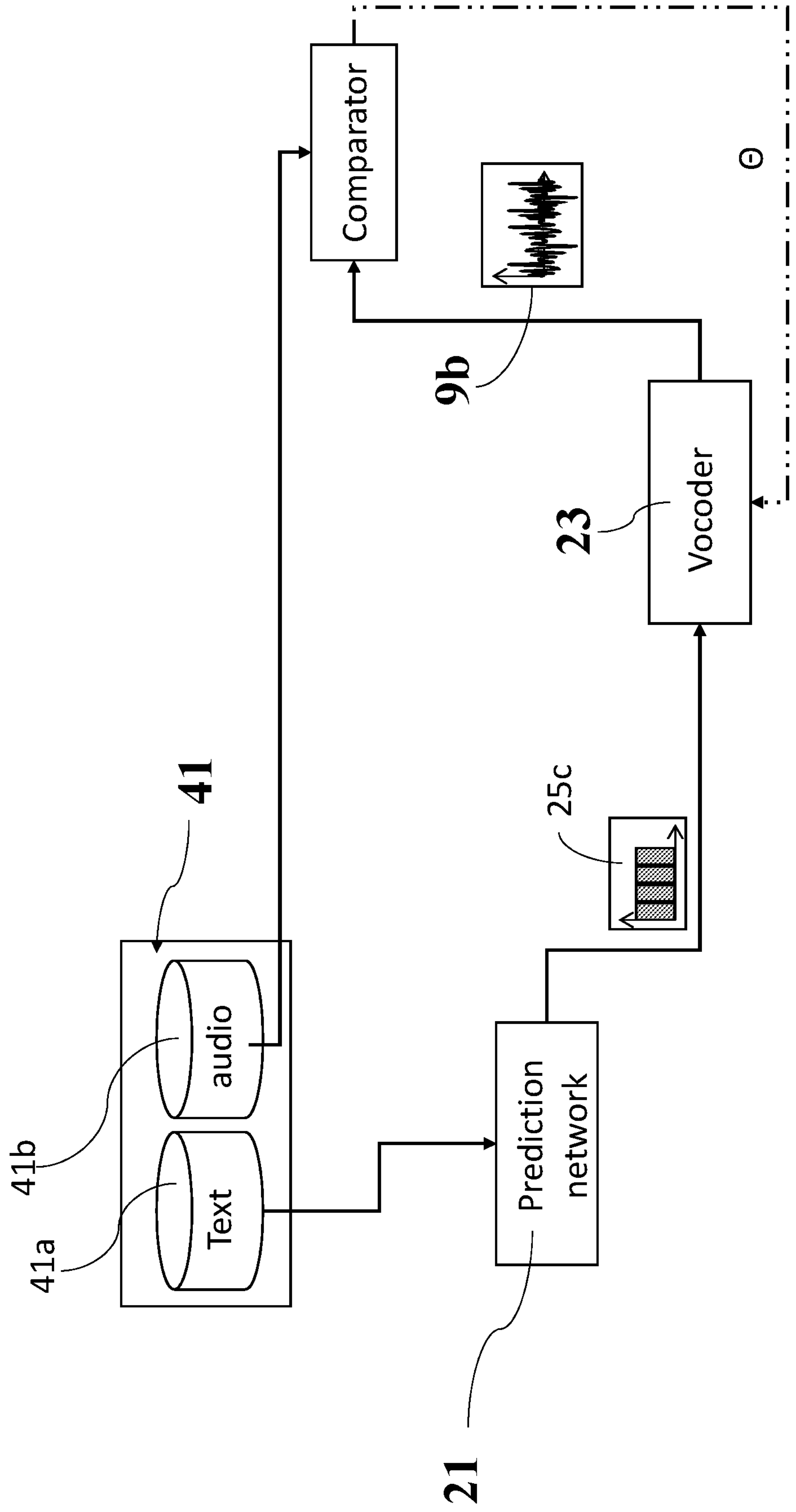
Figure 3:
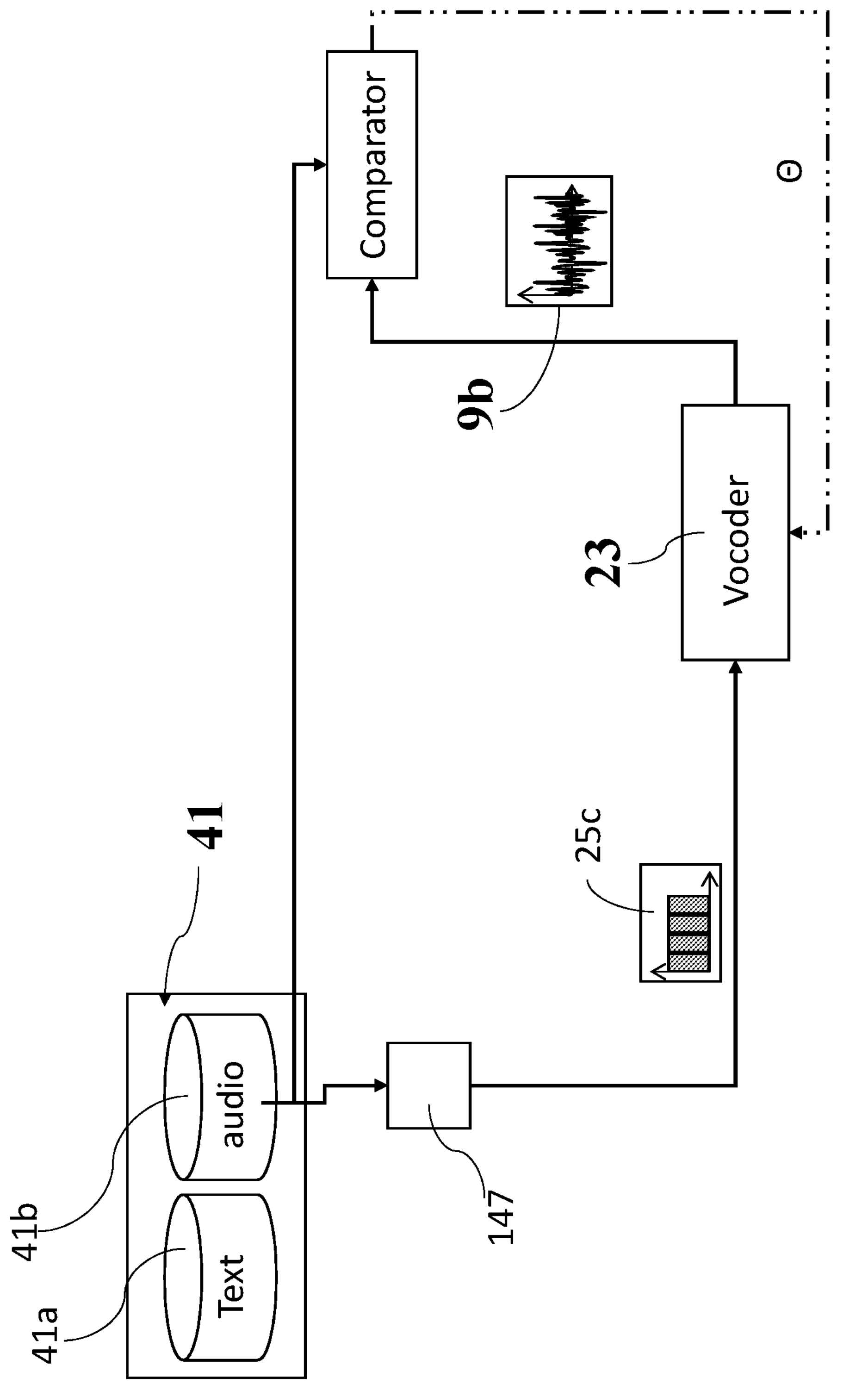

FIG. 3(*a*) shows a schematic illustration of a configuration for training the prediction network 21 according to a comparative example. The prediction network 21 is trained independently of the Vocoder 23. According to an example, the prediction network 21 is trained first and the Vocoder 23 is then trained independently on the outputs generated by the prediction network 21.

According to an example, the prediction network 21 is trained from a first training dataset 41 of text data 41*a* and audio data 41*b* pairs as shown in FIG. 3(*a*). The Audio data 41*b* comprises one or more audio samples. In this example, the training dataset 41 comprises audio samples from a single speaker. In an alternative example, the training set 41 comprises audio samples from different speakers. When the audio samples are from different speakers, the prediction network 21 comprises a speaker ID input (e.g. an integer or learned embedding), where the speaker ID inputs correspond to the audio samples from the different speakers. In the figure, solid lines (—) represent data from a training sample, and dash-dot-dot-dash (—••—) lines represent the update of the weights Θ of the neural network of the prediction network 21 after every training sample. Training text 41*a* in fed in to the prediction network 21 and a prediction of the intermediate speech data 25*b* is obtained. The corresponding audio data 41*b* is converted using a converter 47 into a form where it can be compared with the prediction of the intermediate speech data 25*b* in the comparator 43. For example, when the intermediate speech data 25*b* is a mel spectrogram, the converter 47 performs a STFT and a non-linear transform that converts the mel spectrogram into audio waveform. The comparator 43 is compared the predicted first speech data 25*b* and the conversion of audio data 41*b*. According to an example, the comparator 43 may compute a loss metric such as a cross entropy loss given by:—(actual converted audio data) log (predicted first speech data). Alternatively, the comparator 43 may compute a loss metric such as a mean squared error. The gradients of the error with respect to the weights Θ of the RNN may be found using a back propagation through time algorithm. An optimiser function such as a gradient descent algorithm may then be used to learn revised weights Θ. Revised weights are then used to update (represented by —••— in FIGS. 3*a* and *b*) the NN model in the prediction network 21.

The training of the Vocoder 23 according to an embodiment is illustrated in FIG. 3(*b*) and is described next. The Vocoder is trained from a training set of text and audio pairs 40 as shown in FIG. 3(*b*). In the figure, solid lines (—) represent data from a training sample, and dash-dot-dot-dash (—••—) lines represent the update of the weights of the neural network. Training text 41*a* is fed in to the trained prediction network 21 which has been trained as described in relation to FIG. 3(*a*). The trained prediction network 21 is configured in teacher-forcing mode—where the decoder 35 of the prediction network 21 is configured to receive a conversion of the actual training audio data 41*b* corresponding to a previous step, rather than the prediction of the intermediate speech data from the previous step—and is used to generate a teacher forced (TF) prediction of the first speech data 25*c*. The TF prediction of the intermediate speech data 25*c* is then provided as a training input to the Vocoder 23. The NN of the vocoder 23 is then trained by comparing the predicted output speech 9*b* with the actual audio data 41*b* to generate an error metric. According to an example, the error may be the cross entropy loss given by:—(actual converted audio data 41*b*) log (predicted output speech 9*b*). The gradients of the error with respect to the weights of the CNN of the Vocoder 23 may be found using a back propagation algorithm. A gradient descent algorithm may then be used to learn revised weights. Revised weights ⊖ are then used to update (represented by —••— in FIG. 3(*b*)) the NN model in the vocoder.

The training of the Vocoder 23 according to another embodiment is illustrated in FIG. 3(*c*) and is described next. The training is similar to the method described for FIG. 3(*b*) except that training text 41*a* is not required for training. Training audio data 41*b* is converted into first speech data 25*c* using converter 147. Converter 147 implements the inverse of the operation implemented by converter 47 described in relation to FIG. 3(*a*). For example, when the intermediate speech data 25*c* is a mel spectrogram, the converter 147 performs the inverse of the non-linear transform that is performed by converter 47 and an inverse STFT. Thus, converter 147 converts the audio waveform into a mel spectrogram. The intermediate speech data 25*c* is then provided as a training input to the Vocoder 23 and the remainder of the training steps are described in relation to FIG. 3(*b*).

Figure 4:
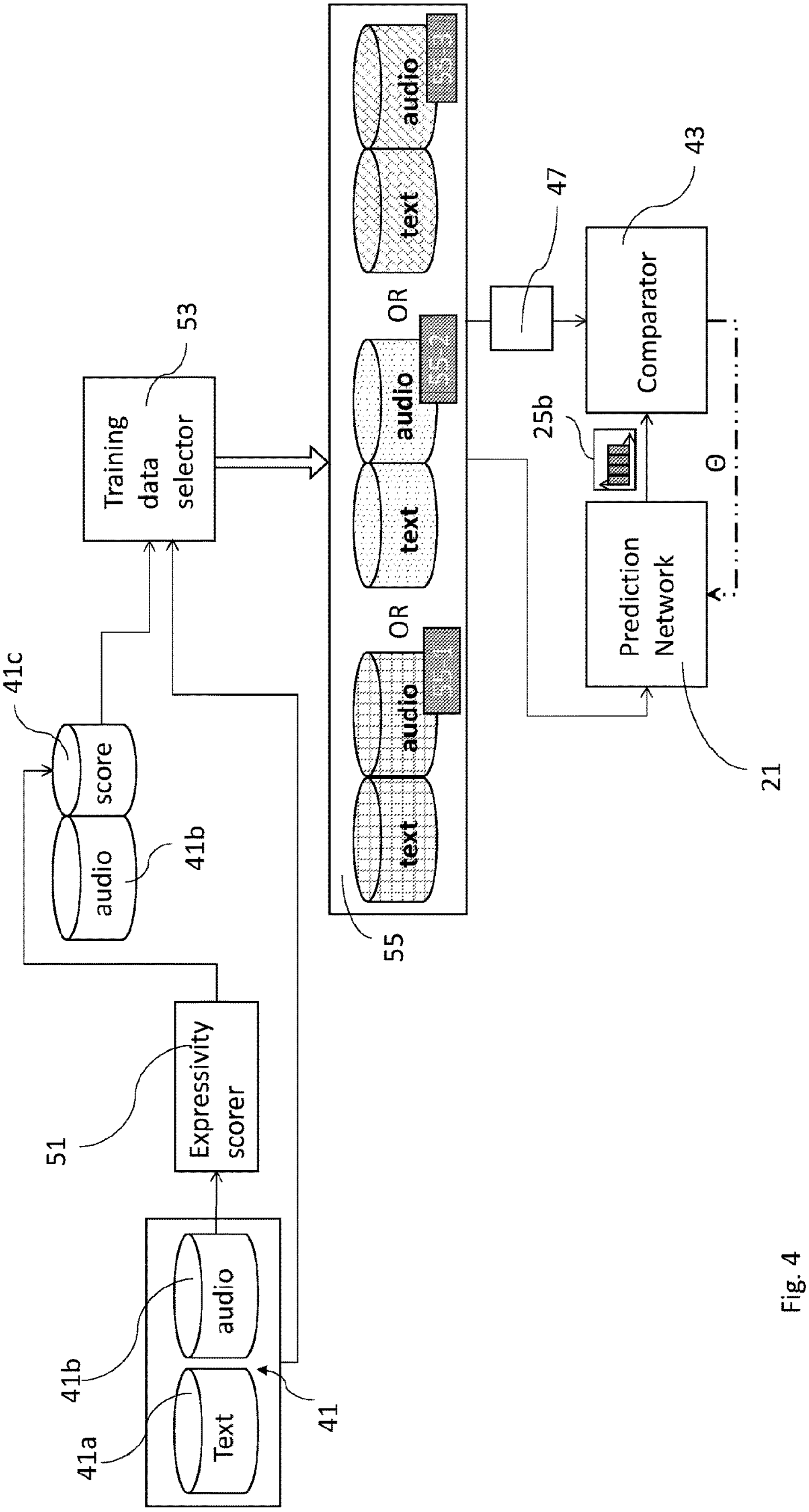
FIG. 4 shows a schematic illustration of the training of the a prediction network in accordance with an embodiment.

FIG. 4 shows a schematic illustration of a configuration for training the prediction network 21 according to an embodiment. The audio data 41*b* from the first training dataset 41 is directed towards an Expressivity scorer module 51. The Expressivity Scorer (ES) module 51 is configured to assign a score that represents the expressivity to each of the samples in audio 41*b*. The ES module 51 is described further below in relation to FIGS. 5(*a*), 5(*b*) and 6. The score 41*c* corresponding to the audio data 41*b* is then directed into a Training Data Selector (TDS) module 53. The TDS is configured to select text and audio data pairs from the training data set 41 according to the expressivity scores of the audio samples. The data selected by the TDS is referred to as the modified training dataset 55. According to one example, the modified training dataset 55 is a dataset that comprises a copy of at least some of the audio and text samples from the first training dataset 41. In another example, the modified training dataset 55 comprises a look up table that points to the relevant audio and text samples in the first training dataset 41.

In an alternative embodiment which is not shown, the audio data 41*b* from the original training dataset 41 is assessed by a human operator. In this case, the human operator listens to the audio data 41*b* and assigns a score to each sample. In yet another alternative embodiment, the audio data 41*b* is scored by several human operators. Each human operator may assign a different score to the same sample. An average of the different human scores for each sample is taken and assigned to the sample. The outcome of human operator based scoring is that audio samples from the audio data 41*b* are assigned a score. As explained in relation to FIG. 4, the score 41*c* corresponding to the audio data 41*b* is then directed into a Training Data Selector (TDS) module 53.

In an embodiment, the audio data 41*b* is assigned a score by the human operator as well as a label indicating a further property. For example, the further property is an emotion (sad, angry, etc . . . ), an accent (e.g. British English, French . . . ), style (e.g. shouting, whispering etc . . . ), or non-verbal sounds (e.g. grunts, shouts, screams, um's, ah's, breaths, laughter, crying etc . . . ). The TDS module is then configured to receive a label as an input and the TDS module is configured to select text and audio pairs that correspond to the inputted label.

In another embodiment, the label indicating the further property is assigned to the audio data 41*b* as it is generated. For example, as a voice actor records an audio sample, the voice actor also assigns a label indicating the further property, where, for example, the further property is an emotion (sad, angry, etc . . . ), an accent (e.g. British English, French . . . ), style (e.g. shouting, whispering etc . . . ), or non-verbal sounds (e.g. grunts, shouts, screams, um's, ah's, breaths, laughter, crying etc . . . ). The TDS module is then configured to receive a label as an input and the TDS module is configured to select text and audio pairs that correspond to the inputted label.

According to another embodiment which described further below in relation to FIG. 7*c*, the TDS module 53 is further configured to select text and audio data pairs from a second dataset 71. The second dataset 71 comprises text and audio data pairs that are not present in the first training dataset 41. Optionally, the second dataset 71 further comprises: data from the same speaker; data from a different speaker; data from the same or a different speaker and conveying a new speech pattern such as emotion (e.g. sadness, anger, sarcasm, etc . . . ), accents (e.g. British English, Australian English, French etc . . . ), style (e.g. shouting, whispering etc . . . ), or non-verbal sounds (e.g. grunts, shouts, screams, um's, ah's, breaths, laughter, crying etc . . . ).

The TDS module will be described further below in relation to FIGS. 7(*a*) and 7(*b*). In the example as shown in FIG. 4, the modified training dataset 55 comprises a first sub-dataset 55-1, a second sub-dataset 55-2, or a third sub-dataset 55-3; however, it will be understood that the modified training dataset 55 may generally comprise a plurality of sub-datasets, such as 2, 3, 4 and so on . . . .

The method of training the prediction network 21 in the configuration shown in FIG. 4 will be described next. The training of the prediction network 21 differs from the training described in relation to FIG. 3(*a*) in that sub-datasets from the modified training dataset 55 are used instead of the first training data set 41. When the modified training dataset 55 comprises more than one sub-dataset, the prediction network 21 may be trained in turn using each sub-dataset. The selection of sub-dataset is performed by the TDS module 53 and this is described further below in relation to FIGS. 7(*a*) and (*b*). For example, referring to the configuration of FIG. 4, the prediction network 21 may initially be trained using first sub-dataset 55-1, then with second sub-dataset 55-2, and then with third sub-dataset 55-3. The use of different sub-datasets may result in a prediction network 21 trained to generate intermediate speech 25 with high expressivity.

FIG. 5(*a*) shows a schematic illustration of the ES module 51 that takes the audio data 41*b* as input and generates score data 41*c* that corresponds to the audio data 41*b*.

Figure 5B:
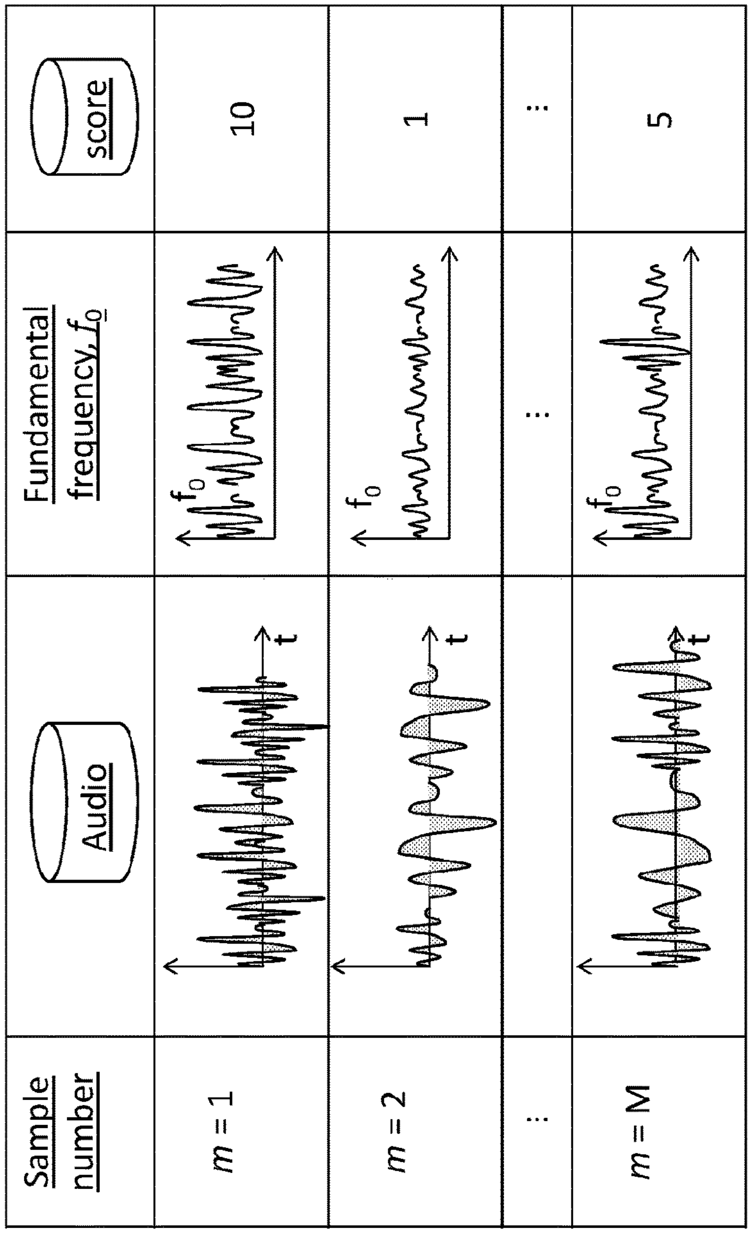

FIG. 5*b* shows a schematic illustration of the determination of an expressivity score by the ES module 51 for different samples from the audio data 41*b*. In the example shown, the expressivity score is derived from a first speech parameter such as the fundamental frequency $f_0$ of the audio waveform. The fundamental frequency $f_0$ of the audio waveform may be estimated from the inverse of the glottal pulse duration, the glottal pulse duration being the duration between repeating patterns in the audio signal that are observed in human speech.

An example of an algorithm for estimating $f_0$ is the YIN algorithm in which: (i) the autocorrelation $r_t$ of a signal $x_t$ over a window W is found; (ii) a difference function (DF) is found from the difference between $x_t$ (assumed to be periodic with period T) and $x_{t+T}$, where $x_{t+T}$ represents signal $x_t$ shifted by a candidate value of T; (iii) a cumulative mean normalised difference function (CMNDF) is derived from DF in (ii) to account for errors due to imperfect periodicities; (iv) an absolute threshold is applied to the value of the CMNDF to determine if the candidate value of T is acceptable; (v) considering each local minimum in the CMNDF; and (vi) determining which value of T gives the smallest CMNDF. However, it will be understood that other parameters such as the first three formants (F1, F2, F3) could also be used. It will also be understood that a plurality of speech parameters could be used in combination. The parameter $f_0$ is related to the perception of pitch by the human ear and is sometimes referred to as the pitch. In the examples shown in FIG. 5(*b*), a plot of $f_0$ with time for each sample is shown. For the m=1 sample, there are rapidly occurring peaks and troughs that occur with different spacings in the time domain waveform of the audio signal (second column) and this results in $f_0$ that varies significantly with time. Such a waveform generally represents an audio segment with high expressivity and might be attributed a maximum expressivity score of 10 for example. Conversely, in the sample m=2, the peak and troughs occur slowly and with about the same spacing and such a sample might be considered to have a low expressivity and might be attributed an expressivity score of 1. The sample m=M shows an example with an intermediate expressivity score of 5.

Figure 6:
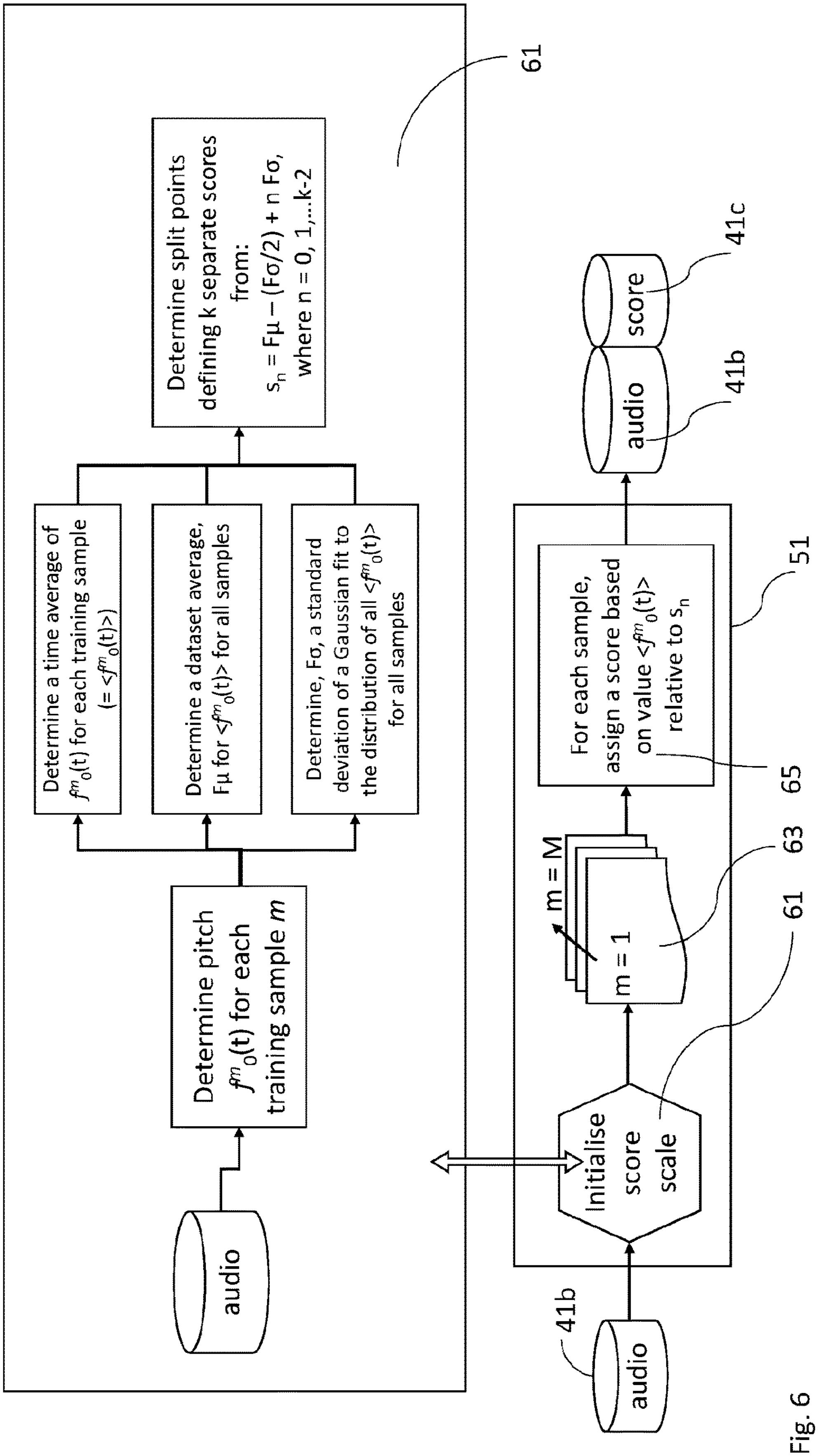
FIG. 6 shows an illustration of a method for assigning expressivity scores to audio data from the training data according to one embodiment.

FIG. 6 shows a schematic illustration of the computation of an expressivity score performed by the ES module 51. The audio data 41*b* is directed into the ES module 51. In the initialisation step 61, for each sample in the audio data 41*b*, the variation of $f_0(t)$ as a function of time is derived. For each sample m, the variation of $f^n_0(t)$ is obtained and a time average $\langle f^n_0(t)\rangle$ is computed. The time average $\langle f^n_0(t)\rangle$ is the first speech parameter, for example. The value of $f^n_0(t)$ is obtained using the Yin algorithm described above for example.

A second speech parameter is determined from the first speech parameter. According to an embodiment, the second speech parameter is obtained as the average of the first speech parameter $\langle f^n_0(t)\rangle$ for one or more samples in the dataset. In an embodiment, as shown in FIG. 6, a discrete value for the expressivity score of an audio sample is computed by the ES module 51.

- The fundamental frequency for the $m^{th}$ sample is denoted by $f^m_0(t)$.
- The time average $(1/w\times\int^w f^m_0(t)\,dt$, where w is the window size) is denoted as $\langle f^m_0\rangle$.
- The average of $\langle f^m_0\rangle$ for all m samples in the dataset is denoted $F_\mu(F_\mu=1/M\times\Sigma^M\langle f^m_0\rangle$, where M represents the total number of samples). $F_\mu$ is also referred to as the dataset average of $f^m_0(t)$. Note that in this case, all M samples correspond to samples from a single speaker. For the case of multiple speakers, the above parameters are calculated separately for each speaker.
- Split points defining k separate levels of increasing expressivity are determined from increasing mean $f_0$. This is represented by: $s_n$, where n=0, 1, 2, . . . , k−1. For example the split points are found from $s_n=F_\mu-(F_0/2)+n\,F_\sigma$, where $F_\sigma$ is the standard deviation of a Gaussian fit to the distribution of all $\langle f^m_0\rangle$ in the dataset.
- A discrete expressivity score $e^m_f$ is assigned to each sample from its value of $\langle f^m_0\rangle$ according to:

$$e_f^m = \begin{cases} 0, & (\langle f_0^m\rangle) \le s_0 \\ 1, & s_0 < (\langle f_0^m\rangle) \le s_1 \\ 2, & s_1 < (\langle f_0^m\rangle) \le s_2 \\ \vdots & \\ k-1, & s_{k-2} < (\langle f_0^m\rangle) \le s_{k-1} \\ k, & s_{k-1} < (\langle f_0^m\rangle) \end{cases}$$

According to another embodiment, the second speech parameter is obtained as the mean of the square of the rate of change of the fundamental frequency for one or more samples in the dataset. A discrete value for the expressivity score of an audio sample is computed by the ES module 51.

- The fundamental frequency for the $m^{th}$ sample is denoted by $f^m_0(t)$.
- The time average $(1/w\times\int^w f^m_0(t)\,dt$, where w is the window size) is denoted as $\langle f^m_0\rangle$.
- The average of $\langle f^m_0\rangle$ for all M samples in the data set is denoted $F_\mu(F_\mu=1/M\times\Sigma^M\langle f^m_0\rangle)$. Note that in this case, all m samples correspond to samples from a single speaker. For the case of multiple speakers, the above parameters are calculated separately for each speaker.
- k different levels regions of increasing expressivity are represented using the mean square rate of change of $f_0$. This is denoted by: $v^m$, where m is the $m^{th}$ sample, and $v^m=1/w\times\Sigma(d\,f^m_0(t)/dt)^2$. For example, the split points are found from $v_n=\alpha_1\times F^v_\sigma+n\times\alpha_2\times F^v_\sigma$, where $F^v_\sigma$ is the standard deviation of a Gaussian fit to the distribution of all $v^m$ in the dataset, n=0, 1, 2, . . . k−1, and $\alpha_1$ and $\alpha_2$ are real numbers. In an example, $\alpha_1=\alpha_2=0.75$.
- A discrete expressivity score $e^m_v$ is assigned to each sample from its value of $v^m$ according to:

$$e_v^m = \begin{cases} 0, & v^m \le v_0 \\ 1, & v_0 < v^m \le v_1 \\ 2, & v_1 < v^m \le v_2 \\ \vdots & \\ k-1, & v_{k-2} < v^m \le v_{k-1} \\ k, & v_{k-1} < v^m \end{cases}$$

According to another embodiment, a discrete value for the expressivity score of an audio sample is formed using $e^m_f$ and $e^m_v$ in combination.

According to an example, k=10 such that discrete expressivity scores of 0, 1, 2, . . . ,10 are available. According to one example, a sample having an expressivity score of 1 or above is considered to be expressive. It will be understood, however, that samples having scores above any predetermined level may be considered to be expressive. For example, it may be preferred that a sample having a score above any value from 2, 3, 4, 5, 6, 7,8, 9, 10 or any value therebetween, is considered to be expressive.

According to one example which is not shown, the average is the arithmetic mean, or median, or mode, of all the time averaged $f^m_0(t)$. Furthermore, for each sample, the variability of $f^m_0(t)$ for each sample, denoted as $\sigma^m_0$, is computed. The average variability, which is the average value of $\sigma^m_0$ for all samples is determined. The average variability may be the arithmetic mean, or median, or mode of all values of $\sigma^m_0$. The average variability is assigned an expressivity score of zero. For the other end of the scale, the maximum value of $\sigma^m_0$ over all m samples is identified and assigned a value of 10. In step 63 and 65, each sample is assigned an expressivity score equal to $|\sigma^m_0 - \text{average variability}| \times 10$. Although the example above describes a score in the range of 0 to 10, it will be understood that the score could be in the range of 0 to 1, or between any two numbers. Furthermore, it will be understood that although a linear scoring scale is described, other non-linear scales may also be used. The ES module 51 then outputs a score data 41*c* whose entries correspond to the entries of the audio data 41*b*.

In one embodiment, the expressivity score is computed for an entire audio sample, that is, for the full utterance.

In another embodiment, the expressivity score is computed for the audio sample on a frame-by-frame basis. The expressivity score computation is performed for several frames of the sample. An expressivity score for the sample is then derived from the expressivity scores for each frame, for example by averaging.

In another embodiment (which is not shown), the audio sample is further labelled with a further property. The further property label is assigned by a human operator for example. For example, the further property is an emotion (sad, happy, angry, etc . . . ), an accent (e.g. British English, French . . . ), style (e.g. shouting, whispering etc . . . ), or non-verbal sounds (e.g. grunts, shouts, screams, um's, ah's, breaths, laughter, crying etc . . . ). In the calculation of the expressivity score described above in relation to FIG. 6, the ES module 51 generates a score according to quantitative characteristics of the audio signal (as described above). Features, such as whether the audio sample conveys a particular emotion, accent, style or non-verbal sound, are not taken into consideration. Thus, an audio sample conveying sadness may have the same expressivity score as an audio sample conveying happiness, for example.

FIG. 7(*a*) is a schematic illustration of the selection of sub-datasets from the modified training dataset 55 by the TDS module according to an embodiment. According to this example, the sub-datasets 55-1, 55-2, and 55-3 are selected such that the average expressivity score of the second sub-dataset 55-2 is greater than that of the first sub-dataset 55-1, and that the average expressivity score of the third sub-dataset 55-3 is greater than that of the second sub-dataset 55-2. Although FIG. 7(*a*) shows an example with three sub-datasets, any number of sub-datasets greater than two could be used as long as the average expressivity score of the sub-datasets is progressively higher. The effect of training the prediction network 21 with sub-datasets with increasing average expressivity scores is that the prediction network 21 is trained to generate highly expressive intermediate speech data. By training with a plurality of datasets with increasing average expressivity scores, the trained prediction network 21 generates highly expressive intermediate speech data 25. By initially training with diverse samples having a low average expressivity score (e.g. sub-dataset 55–1), the prediction network 21 learns to produce comprehensible speech from text accurately.

This knowledge is slow to learn but is retained during training with subsequent sub-datasets containing expressive audio data. By progressively training with sub-datasets comprising samples having an increasing average expressivity score, the trained prediction network 21 learns to produce speech having a high expressivity. By contrast, if the prediction network 21 was not provided with increasingly expressive data sets for training, the prediction network 21 would learn to produce speech corresponding to the average of a diverse data set having a low average expressivity score.

The TDS module 53 is configured to change from one sub-dataset to another sub-dataset so that the prediction network 21 may be trained in turn with each sub-dataset.

In one embodiment, the TDS is configured to change sub-dataset after a certain number of training steps have been performed. The first sub-dataset 55-1 may be used for a first number of training steps. The second sub-dataset 55-2 may be used for a second number of training steps. The third sub-dataset 55-3 may be used for a third number of training steps. In one embodiment, the number of training steps are equal. In another embodiment, the number of training steps is different; for example the number of training steps decreases exponentially.

In another embodiment, the TDS is configured to change sub-dataset after an amount of training time has passed. The first sub-dataset 55-1 is used for a first time duration. The second sub-dataset 55-2 is used for a second time duration. The third sub-dataset 55-3 is used for a third time duration. In one embodiment, the time durations are equal. In another embodiment, the time durations are different, and, for example, are reduced when a sub-dataset is changed. For example, the first time duration is one day.

In another embodiment, the TDS is configured to change sub-dataset after a training metric of the neural network training reaches a predetermined threshold. In an example, the training metric is a parameter that indicates how well the output of the trained neural network matches the audio data used for training. An example of a training metric is the validation loss. For example, the TDS is configured to change sub-dataset after the validation loss falls below a certain level. In another embodiment, the training metric is the expressivity score as described in relation to FIG. 6. In this case, the TDS is configured to change sub-dataset after the expressivity score of the intermediate speech 25*b* (which is converted to output speech 9 before scoring as necessary, for example, using converter 147) generated by the prediction network 21 being trained reaches a predetermined threshold. In an example, when the expressivity scores are in the range of 0, 1, . . . 10, a suitable threshold is 6.

In yet another embodiment, the prediction network 21 is trained for a predetermined amount of time, and/or a number of training steps, and the performance of the prediction network 21 is verified on test sample text and audio pairs, and if the intermediate speech data 25 meets a predetermined quality, the sub-dataset is changed. In one embodiment, the quality is determined by a human tester who performs a listening test. In another embodiment, the quality is determined comparing the predicted intermediate speech data with the test audio data (which is converted using converter 47 if necessary) to generate an error metric. In yet another embodiment, the quality is determined by obtaining an expressivity score for the intermediate speech data 25*b* (which is converted to a time domain waveform if necessary) and comparing it with the expressivity score of the corresponding sample from the audio data 41*b*.

Figure 7B:
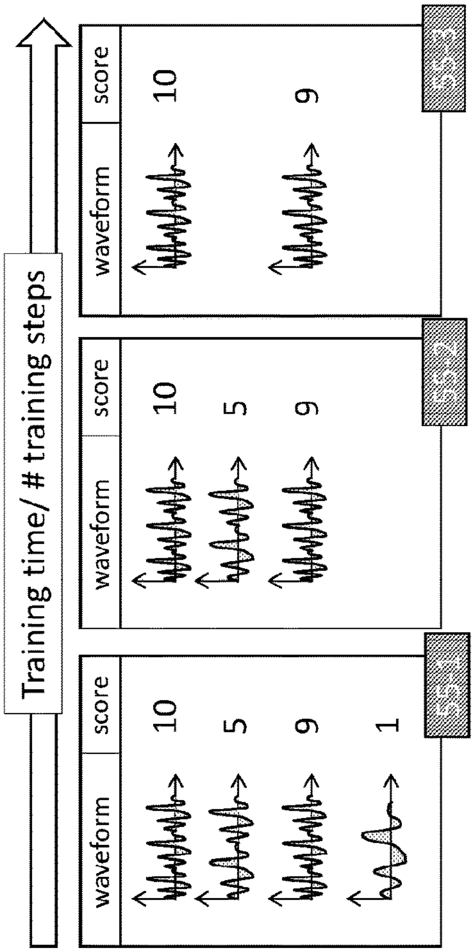
FIG. 7(*a*) shows an illustration of selection of training data selector providing data with increasing average expressivity scores as training progresses according to one embodiment.
Figure 7A:
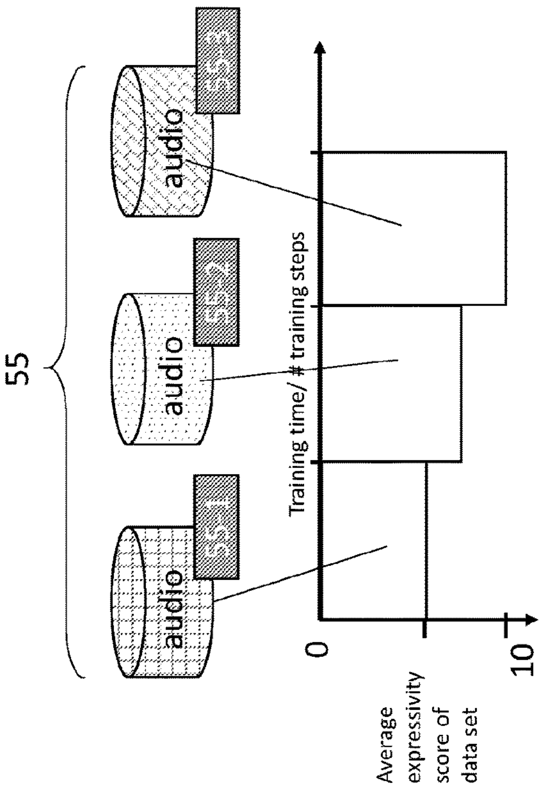

FIG. 7*b* shows a schematic illustration of the sub-datasets 55-1, 55-2, and 55-3 and how they are obtained by pruning. In the example shown, sub-dataset 55-1 contains samples with a wide range of expressivity scores. Sub-dataset 55-1 may comprise all the samples of the first data set 41 for example. In sub-dataset 55-2, the sample with a low expressivity score of 1 is pruned from sub-dataset 55-1, thus increasing the average expressivity score of sub-dataset 55-2. In sub-dataset 55-3, the sample with a expressivity score of 5 is further pruned, thus further increasing the average expressivity score of sub-dataset 55-3. In the example of FIG. 7*b*, a single sample is pruned from every sub-dataset; however, it will be understood that any number of samples may be pruned from every sub-dataset. In an example, the number of samples removed from each subsequent data set is equal to a pruning ratiox number of samples. In an example, the pruning ratio is 0.5.

In another example, which is not shown, the sub-datasets 55-1, 55-2, and 55-3 are obtained by sorting samples of the audio data 41*b* according to their expressivity scores, and allocating the lower scoring samples to sub-dataset 55-1, the intermediate scoring samples to sub-dataset 55-2, and the high scoring samples to sub-dataset 55-3. When the prediction network 21 is trained using these sub-datasets in turn, the prediction network 21 may be trained to generate highly expressive intermediate speech data 25.

Figure 7C:
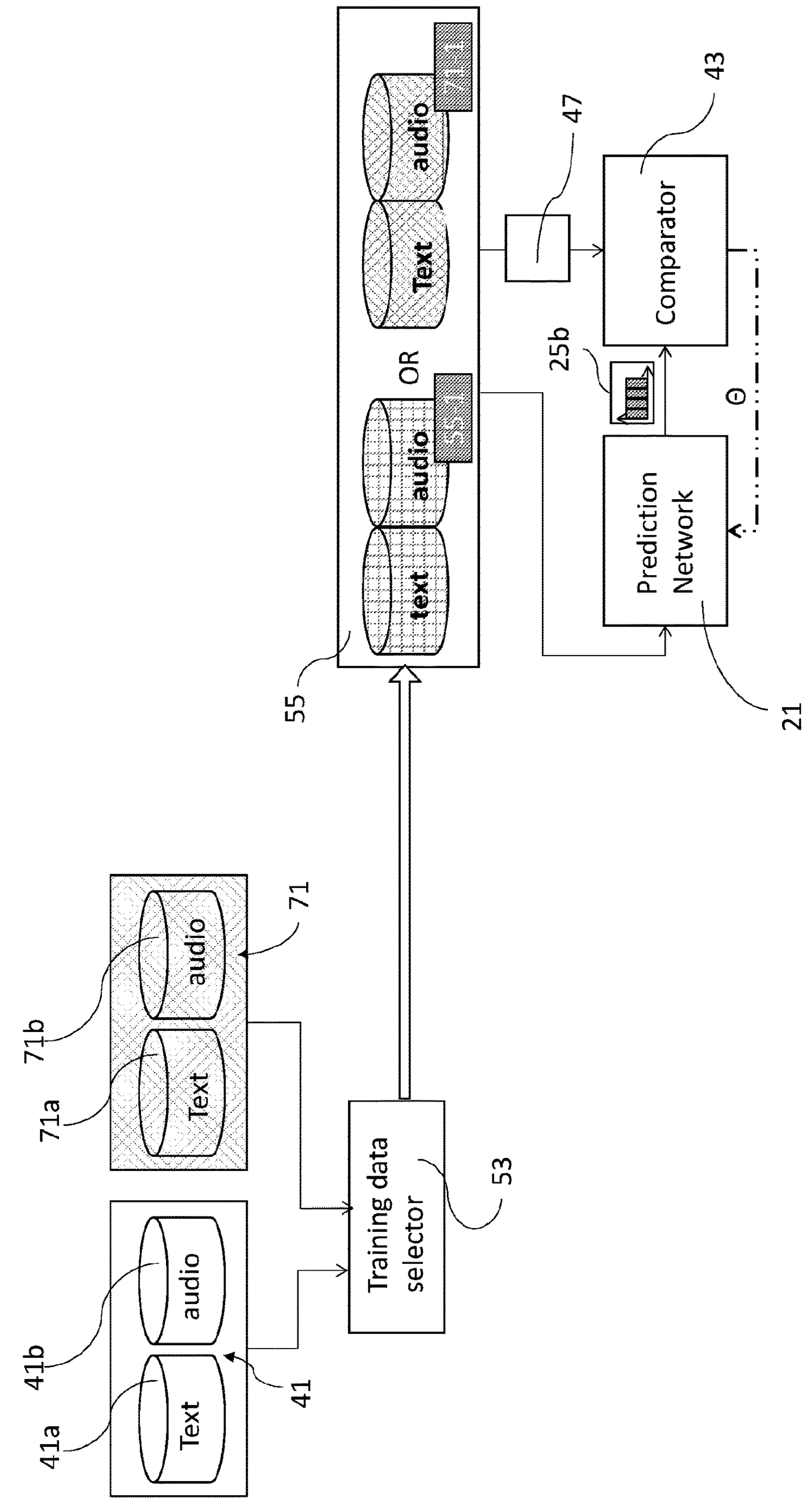

FIG. 7*c* shows a schematic illustration of the selection of datasets for training the prediction network 21 by the TDS module 53 according to another embodiment. The TDS module 53 is configured to select data from the first training dataset 41 as well as another second training dataset 71. According to one option, dataset 71 comprises audio data that is on average more expressive that the audio data of the first training dataset 41. The second training dataset 71 comprises text 71*a* and corresponding audio 71*b*. Further training datasets (not shown) could be added. The second dataset 71 comprises samples that are not part of the first training dataset. According to an embodiment, the second dataset 71 further comprises: data from the same speaker; data from a different speaker; data from the same speaker and conveying a new speech pattern such as sadness, anger, sarcasm, etc . . . ; or, data from a different speaker and conveying a new speech pattern such as sadness, anger, sarcasm, etc. . . .

The TDS module 53 is configured to select data pairs from the first training dataset 41 to generate sub-dataset 55-1, and to select data pairs from the second training dataset 71 to generate sub-dataset 71-1. In one example, sub-datasets 55-1 and/or 71-1 are formed by using features such as expressivity scoring (as described in relation to FIG. 4). In another example, sub-datasets 55-1 and/or 71-1 may be formed using a different selection procedure, such as selection by human operators. In a further example, sub-dataset 55-1 comprises all the samples of the first dataset 41, and/or sub-dataset 71-1 comprises the samples of the second dataset 71. Sub-dataset 71-1 is used to train the prediction network to generate output speech conveying a further property. For example, when sub-dataset 71-1 comprises speech patterns conveying emotions such as sadness, the prediction network 21 is trained to produce intermediate speech data 25 that sounds sad. In other examples, sub-dataset 71-1 comprises speech patterns reflecting a different gender, a different accent, or a different language. Therefore, the prediction network 21 can be trained to have additional abilities.

Although this is not shown, it will be understood that the example of FIG. 7*c* can be combined with features from FIG. 4 such as the Expressivity scorer.

In a further example which is not shown, the prediction network 21 can be trained initially to generate speech 25 according to any of the examples described in relation to FIGS. 4, 5*a*, 5*b*, 6, 7*a* and/or 7*b* so that the generated speech is expressive. The prediction network 21 is further trained using the second dataset 71 in order to impart the model with a further ability. The initial training of the prediction network 21 can be understood as a pre-training step that gives the network the ability to generate expressive speech. This ability of the pre-trained prediction network 21 is used as a starting point and transferred during the further training with the second dataset 71 (transfer learning). The prediction network 21 that is pre-trained and then further trained according to this example retains expressive speech generation ability and gains a further ability.

Figure 8:
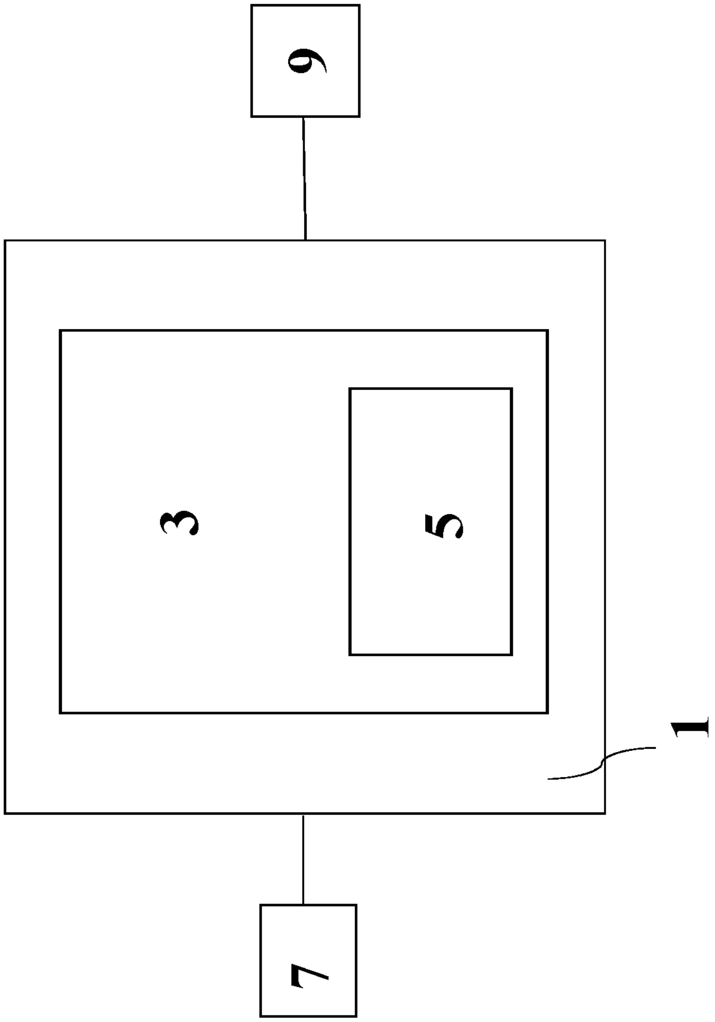
FIG. 8 shows an illustration of a text-to-speech (TTS) system according to one embodiment.

FIG. 8 shows a schematic illustration of a text-to-speech (TTS) system according to an embodiment.

The TTS system 1 comprises a processor 3 and a computer program 5 stored in a non-volatile memory. The TTS system 1 takes as input a text input 7. The text input 7 may be a text file and/or information in the form of text. The computer program 5 stored in the non-volatile memory can be accessed by the processor 3 so that the processor 3 executes the computer program 5. The processor 3 may comprise logic circuitry that responds to and processes the computer program instructions. The TTS system 1 provides as output a speech output 9. The speech output 9 may be an audio file of the synthesised speech and/or information that enables generation of speech.

The text input 7 may be obtained from an external storage medium, a communication network or from hardware such as a keyboard or other user input device (not shown). The output 9 may be provided to an external storage medium, a communication network, or to hardware such as a loudspeaker (not shown).

In an example, the TTS system 1 may be implemented on a cloud computing system, which transmits and receives data. Although a single processor 3 is shown in FIG. 1, the system may comprise two or more remotely located processors configured to perform different parts of the processing and transmit data between them.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A text-to-speech synthesis method comprising:

receiving text;

inputting the received text in a prediction network; and generating speech data, wherein the prediction network comprises a neural network, and wherein the neural network is trained by:

receiving a first training dataset comprising audio data and corresponding text data;

acquiring an expressivity score for each audio sample of the audio data, wherein the expressivity score is a quantitative representation of how well an audio sample conveys emotional information and sounds natural, realistic and/or human-like;

training the neural network using a first sub-dataset, and further training the neural network using a second sub-dataset, wherein the first sub-dataset and the second sub-dataset comprise audio samples and corresponding text from the first training dataset and wherein an average expressivity score of the audio data in the second sub-dataset is higher than an average expressivity score of the audio data in the first sub-dataset.

2. The method of claim 1, wherein acquiring the expressivity score comprises:

extracting a first speech parameter for each audio sample;

deriving a second speech parameter from the first speech parameter; and comparing a value of the second speech parameter to a value of the first speech parameter.

3. The method of claim 2, wherein the first speech parameter comprises the fundamental frequency.

4. The method of claim 2, wherein the second speech parameter comprises an average of the first speech parameter of all audio samples in the dataset.

5. The method of claim 2, wherein the first speech parameter comprises a mean of the square of a rate of change of the fundamental frequency.

6. The method of claim 1, wherein the second sub-dataset is obtained by pruning audio samples with lower expressivity scores from the first sub-dataset.

7. The method of claim 1, wherein audio samples with a higher expressivity score are selected from the first training dataset and allocated to the second sub-dataset, and audio samples with a lower expressive score are selected from the first training dataset and allocated to the first sub-dataset.

8. The method of claim 1, wherein the neural network is trained using the first sub-dataset for a first number of training steps, and then using the second sub-dataset for a second number of training steps.

9. The method of claim 1, wherein the neural network is trained using the first sub-dataset for a first time duration, and then using the second sub-dataset for a second time duration.

10. The method of claim 1, wherein the neural network is trained using the first sub-dataset until a training metric achieves a first predetermined threshold, and then further trained using the second sub-dataset.

11. A method of training a text-to-speech synthesis system that comprises a prediction network, wherein the prediction network comprises a neural network, the method comprising:

receiving a first training dataset comprising audio data and corresponding text data;

acquiring an expressivity score from each audio sample of the audio data, wherein the expressivity score is a quantitative representation of how well an audio sample conveys emotional information and sounds natural, realistic and/or human-like;

training the neural network using a first sub-dataset, and further training the neural network using a second sub-dataset, wherein the first sub-dataset and the second sub-dataset comprise audio samples and corresponding text from the first training dataset and wherein an average expressivity score of the audio data in the second sub-dataset is higher than an average expressivity score of the audio data in the first sub-dataset.

12. The method of claim 11, further comprising training the neural network using a second training dataset.

13. The method of claim 12, wherein an average expressivity score of the audio data in the second training dataset is higher than an average expressivity score of the audio data in the first training dataset.

14. A text-to-speech synthesis system comprising:

a prediction network that is configured to receive text and generate speech data, wherein the prediction network comprises a neural network, and wherein the neural network is trained by:

receiving a first training dataset comprising audio data and corresponding text data;

acquiring an expressivity score to each audio sample of the audio data, wherein the expressivity score is a quantitative representation of how well an audio sample conveys emotional information and sounds natural, realistic and/or human-like;

training the neural network using a first sub-dataset, and further training the neural network using a second sub-dataset, wherein the first sub-dataset and the second sub-dataset comprise audio samples and corresponding text from the first training dataset and wherein an average expressivity score of the audio data in the second sub-dataset is higher than an average expressivity score of the audio data in the first sub-dataset.

15. The text-to-speech synthesis system of claim 14, comprising a vocoder that is configured to convert the speech data into an output speech data.

16. The text-to-speech synthesis system of claim 14, wherein the prediction network comprises a sequence-to-sequence model.

17. Speech data stored in a non-transitory carrier medium synthesised by a method according to claim 1.

18. Speech data according to claim 17, wherein the speech data is an audio file of synthesised expressive speech.

19. A non-transitory carrier medium comprising computer readable code configured to cause a computer to perform the method of claim 1.

* * * * *